United States Patent [19]

Crisci

[11] Patent Number: 4,692,736

[45] Date of Patent: Sep. 8, 1987

[54] VEHICLE FLASHER

[76] Inventor: Victor Crisci, 70 Lenox Rd., Wayne, N.J. 07470

[21] Appl. No.: 724,455

[22] Filed: Apr. 17, 1985

[51] Int. Cl.$^4$ .............................................. B60Q 1/46
[52] U.S. Cl. .................................. 340/81 R; 340/76; 340/134; 310/10
[58] Field of Search .................... 340/81 R, 81 F, 76, 340/74, 134; 310/10 LS

[56] References Cited

U.S. PATENT DOCUMENTS

| | | | |
|---|---|---|---|
| 3,436,728 | 4/1969 | Silverwood et al. | 340/76 |
| 3,784,975 | 1/1974 | Ward | 340/76 |
| 4,096,474 | 6/1978 | Greer et al. | 340/65 |
| 4,155,069 | 5/1979 | Mason | 340/81 R |
| 4,262,277 | 4/1981 | Abonia | 340/76 |

*Primary Examiner*—Glen R. Swann, III
*Assistant Examiner*—Jeffery A. Hofsass
*Attorney, Agent, or Firm*—Thomas L. Adams

[57] ABSTRACT

A flasher can flash a vehicle light normally powered by a power switch. The flasher has an interval timer coupled to a manual switch. The interval timer can provide in response to the operation of the manual switch a duration signal of at least a predetermined duration. The flasher also has a cycling timer coupled to the interval timer for providing a periodic cycling signal in response to and for the duration of the duration signal. This predetermined duration of the duration signal exceeds the period of the periodic cycling signal. The flasher includes a pulsing relay for providing a power output. This pulsing relay is coupled to the cycling timer for blanking the power output in response to and synchronously with the cycling signal. Also included is a substitution relay coupled to the power switch. The interval timer and the pulsing relay can repower the light from the pulsing relay instead of the power switch, in response to and for the duration of the duration signal. Thus the vehicle light is flashed for the predetermined duration.

15 Claims, 3 Drawing Figures

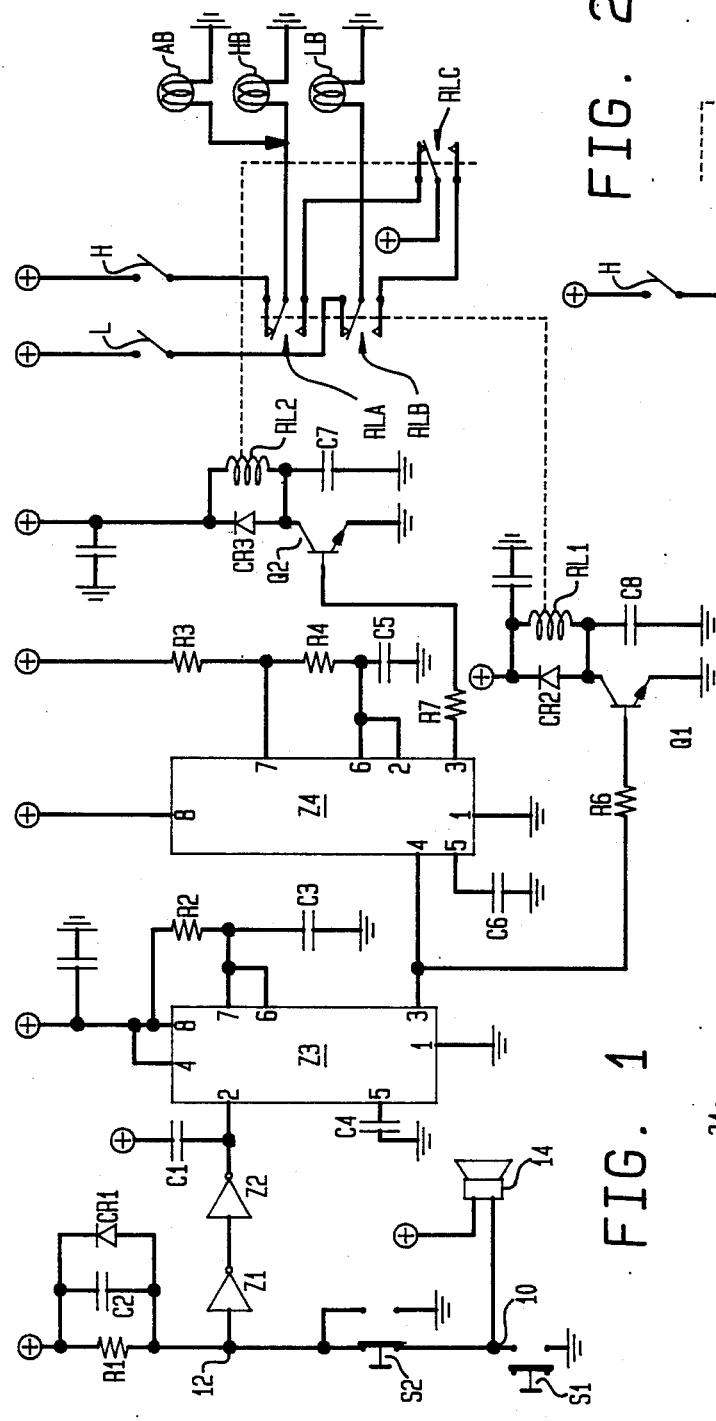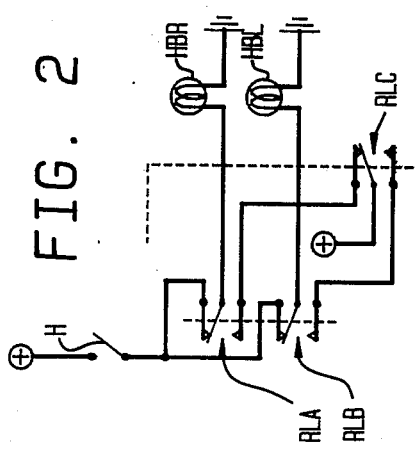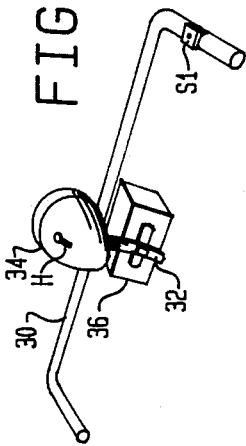

VEHICLE FLASHER

BACKGROUND OF THE INVENTION

The present invention relates to vehicle flashers and, in particular, to apparatus for providing a self cancelling flashing signal. In operating a vehicle such as a bicycle, motorcycle or automobile, it is often necessary to give a warning signal by flashing a light. Such flashing, if done manually, occupies the drivers hands and distracts him from controlling his vehicle. This situation is exacerbated by the fact that the driver may wish to simultaneously sound the horn while he flashes his lights.

It is known to provide a turn signal from an electronic circuit that flashes the turn signal indicator for a predetermined time before cancelling the flashing operation. Because they concern turn signals, these known circuits fail to recognize some of the advantage that can be built into a more general system signaling. Known flashing circuits have included a pair of timing circuits. The circuits are arranged so that both timers, however, must be operational before any response is delivered to the light. Thus there is no opportunity to signal should only one circuit be operational. This defeats any failsafe operation.

Also known flashing circuits have not been arranged to require that an upstream interval circuit be successfully operated before the higher frequency flashing circuit begins operating. Instead, known circuits have triggered a high speed cycling circuit directly from a manual switch to render the high speed cycling circuit self-perpetuating. This self-perpetuating circuit requires the successful operation of another timer circuit to terminate the flashing. Such circuits fail to prevent flashing at the outset should the long term interval timer be defective. Accordingly, there is a need for an improved and relatively simple circuit for flashing a warning light in a reliable and preferably failsafe manner.

SUMMARY OF THE INVENTION

In accordance with the illustrative embodiments demonstrating features and advantages of the present invention, there is provided a flasher for flashing a vehicle light normally powered by a power switch. The flasher has an interval means coupled to a manual switch for providing in response to its operation, a duration signal of at least a predetermined duration. The flasher also has a cycling means coupled to the interval means for providing a periodic cycling signal in response to and for the duration of the duration signal. The predetermined duration of the duration signal exceeds the period of the periodic cycling signal. The flasher also has a substitution means and a pulsing means. The pulsing means can provide a power output. This pulsing means is coupled to the cycling means for blanking the power output in response to and synchronously with the cycling signal. The substitution means is coupled to the power switch, the interval means and the pulsing means for repowering the light from the pulsing means instead of the power switch in response to and for the duration of the duration signal. Thus the vehicle light is flashed for the predetermined duration.

By providing a flasher of the foregoing type a highly improved flashing system is provided. In a preferred embodiment, a pair of timers are arranged with a long term interval timer triggering a higher speed cycling timer. It is preferred to have the higher speed cycling timer triggered by the interval timer so that cycling does not commence unless the interval timer is operating satisfactorily. The preferred timers are analog timers having readily adjustable timing intervals although digital timers are possible.

The preferred flasher has relays independently driven by the interval timer and the higher speed cycling timer. Preferably, the relay driven by the higher speed cycling timer produces a pair of blanked power outputs blanked at opposite phases in synchronism with the cycling timer. These blanked power outputs and the normal light switches are applied preferably to a substitution relay that substitutes the blanked power output for the power applied by the normal light switches. In a constructed embodiment the relays were arranged to provide failsafe operation so that the normal light switches are operable should the interval timer (and thus the cycling timer) fail. Also the relays are preferably arranged so that if only the interval timer operates and not the cycling timer, the light that was to be flashed will at least illuminate for a predetermined duration.

BRIEF DESCRIPTION OF THE DRAWING

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein:

FIG. 1 is a schematic diagram of a flasher according to the principles of the present invention;

FIG. 2 is a partial schematic diagram of a circuit which is an alternate to a portion of the circuit of FIG. 1; and FIG. 3 is a perspective view showing the mounting of certain components of the flasher on a bicycle.

DETAILED DESCRIPTION OF THE PREFERRED EMBODIMENTS

Referring to FIG. 1 a flasher is shown including a manual switch S1 in the form of a normally open, push button switch connected between ground and terminal 10. A normally closed, manual switch S2 (push button type, single pole, double throw) has two pairs of alternately shortable contacts, the first pair connected between terminal 12 and 10, the other pair between terminal 12 and ground. Therefore, terminals 12 and 10 are normally connected; otherwise terminal 12 is grounded.

It is to be understood that switch S1 and S2 are optional and either one may be eliminated. When switches S1 and S2 are employed, horn 14 is connected between terminal 10 and positive potential, in this embodiment 12 volts from a conventional automobile or bicycle battery. Under these circumstances switch S2 will operate as a silent switch for the reasons given hereinafter. Terminal 12 is the input to a pair of inverting buffers Z1 and Z2 cascaded between terminal 12 and one terminal of filtering capacitor C1, whose other terminal is connected to positive potential. Terminal 12 also has connected between it and positive voltage a pull-up resistor R1, a filtering capacitor C2 and protective diode CR1. The cathode of the latter being connected to positive potential.

An interval means, shown herein as an integrated circuit Z3, is preferably a CA555 analog timing circuit manufactured by RCA or an equivalent. While an analog timer is disclosed, it will be appreciated that digital circuitry may be used instead. Furthermore, the specific timing circuitry employed by timer Z3 can be different and in some embodiments a one shot multivibrator may be employed. Integrated circuit Z3 has its terminals 4 and 8 connected to positive potential and its terminal 1 grounded. Filtering capacitor C4 is connected between terminal 5 of circuit Z3 and ground. Its input triggering terminal 2 is connected to the output of inverter Z2. A timing circuit is formed by the junction of terminals 7 and 6 and one terminal each of resistor R2 and capacitor C3, whose other terminals are connected to positive potential and ground, respectively. Timer Z3 is structured so that a ground potential applied to its terminal 2 produces a high output on its terminal 3, which whose signal remains high for a predetermined interval, in this embodiment 4 seconds. This duration can, however, be altered, but it is preferred to keep the duration between 3 to 6 seconds.

A cycling means, shown herein as integrated circuit Z4, may be identical to previously mentioned circuit Z3. Again filtering is provided at terminal 5 by shunting capcitor C6, while terminals 8 and 1 are connected to positive potential and ground, respectively. This circuit is connected to oscilate by incorporating a charging circuit comprising resistor R3 having one terminal connected to positive potential and its other terminal connected through resistor R4 to one terminal of capacitor C5 whose other terminal is grounded. The junction of resistors R3 and R4 is connected to terminal 7, the junction of resistor R4 and capacitor C5 to terminals 6 and 2 of integrated circuit Z4. Being connected in this way, circuit Z4 will allow charging of capacitor C5 through resistors R3 and R4 until a threshold level voltage is reached across capacitor C5, after which capacitor C5 is discharged through resistor R4 into terminal 7 of circuit Z4. The resulting oscillating occurs so long as a high signal appears on reset terminal 4 of circuit Z4.

Thus a high output from terminal 3 of circuit Z3 applied to reset terminal 4 of circuit Z4 will allow the latter to oscillate. This cycling signal appears as a square wave on output terminal 3 of circuit Z4. In a constructed embodiment the cycling of circuit Z4 occurs at a 2 Hertz rate, although clearly other repetition rates will be satisfactory, depending on the visual effect desired by the designer.

A substitution means is shown herein including a substitution relay having relay coil RL1 and associated contacts. Associated therewith is an NPN transistor Q1 whose base is connected through resistor R6 to terminal 3 of citcuit Z3. The emitter of transistor Q1 is grounded, its collector being connected to the anode of diode CR2 whose cathode is connected to positive potential. Previously mentioned relay coil RL1 is connected in parallel with diode CR2. A grounding capacitor C8 is connected between the collector of transistor Q1 and ground. Associated with relay coil RL1 are contacts RLA and RLB, each being a single pole, double throw switch illustrated in its normal (unenergized) position. The pole of relay RLA is connected to one terminal each of lighting elements shown herein as high beam light HB and auxillary beam light AB, the other terminals of these lights being grounded. The normally closed contact of relay RLA is connected through high beam switch H to positive potential. Switch H is a switch that may be preexisting in an automobile or in a bicycle. In an automobile, switch H would be used to energize the high beam headlights. High beam headlights are indicated by lamp HB, it being understood that a pair of lights are connected in parallel in conventional automobiles. Alternatively, light AB is shown connected in parallel with high beam lamps HB. Lamp AB may be a separate signaling beam mounted on the automobile for warning purposes. Alternatively, lamp AB may represent a single sealed beam on a bicycle or a motorcycle in which case high beam lamps HB would be eliminated.

The normally closed contact of relay contacts RLB is connected through switch L to positive potential. In this embodiment, switch L may be that switch normally mounted in a conventional automobile to power the low beam headlights. In this embodiment, the low beams are illustrated as lamps LB, it being understood that two such lamps maybe connected in parallel. It will be further understood that high beam lamp HB and low beam lamp LB may be employed in a motorcycle or in a bicycle. Alternatively, some bicycles may employ a single light, in the latter case, then lamp LB, contacts RLB, sealed beam HB and switch L may be eliminated.

A pulsing means is shown herein including a pulsing relay coil RL2 and associated contacts driven by NPN transistor Q2. The output terminal 3 of circuit Z4 is connected through resistor R7 to the base of transistor Q2 whose collector is connected to the anode of diode CR3 whose cathode is connected to positive potential. Connected in parallel across diode CR3 is previously mentioned relay coil RL2. Grounding capacitor C7 is connected to the collector of transistor Q2. Relay contacts RLC associated with relay coil RL2 is a single pole, double throw switch having its pole connected to positive potential. The normally closed contact of relay contacts RLC is connected to the normally open contact of contacts RLA. The normally open contact of contacts RLC is connected to the normally open contact of contacts RLB. The normally open and normally closed contacts of set RLC are referred to herein as output terminals of a pulsing relay.

To facilitate an understanding of the principles associated with the apparatus of FIG. 1, its operation will now be briefly described. The apparatus is mounted in a vehicle and connected to the ground and positive potential of the vehicle battery. For a vehicle having a horn, an existing horn switch S1 may be connected at terminal 10 to switch S2. Alternatively, a new horn can be installed on the vehicle to provide the circuitry shown in FIG. 1. The optional slient switch S2 can be mounted near the steering column for the purposes described hereinafter. The conventional circuit between switches H and L and the various lights LB, HB and AB are broken and the relay contacts RLA, RLB and RLC are inserted as illustrated. Without depressing switches S1 and S2, light switches L and H will work to power lamps LB and HB (and lamp AB if present).

An operator may now initiate operation of the circuit of FIG. 1 by depressing either switch S1 or S2. Depressing switch S2 simultaneously sounds horn 14 while switch S2 does not. In either event, the ground signal applied to the input on inverter Z1 is filtered by elements R1, C2 and CR1. The resulting, low signal, further filtered by capacitor C1, is applied to input 2 of interval timer Z3. In response, discharge terminal 7 of timer Z3 discharges capacitor C3 which then recharges through resistor R2. At the same time, a high signal is applied to input 4 of cycle timer Z4. As described before, the high signal on input terminal 4 of cycle timer Z4 causes capacitor C5 to be alternately charged and discharged at a rate determined by the values of resistors R3 and R4.

Accordingly, the high signal on terminal 3 of timer Z3 turns transistor Q1 on while the repetitive square wave on terminal 3 of timer Z4 turns transistor Q2 alternately on and off. By turning transistor Q1 on, current flows through relay coil RL1 through the collector of transistor Q1. Consequently, the poles of relay contacts RLA and RLB swing downwardly (at least illustratively). As a result, switches L and H are now isolated. Since transistor Q2 is cycled on and off at a two Hertz rate, the relay coil RL2 causes the pole of relay contact RLC to swing also at a two Hertz rate. As a result, voltage is alternatively applied to the poles of relay contacts RLA and RLB so that lamp LB and lamp HB (as well as lamp AB if present) are alternately illuminated (flashed). In the situation where only lamp AB is present, for example, on a bicycle, the result will be that lamp AB flashes alone. For the embodiment where only lamps LB and HB are present, and these represent high and low beams, respectively, the vehicle will illuminate the high beams and low beams alternatively.

This situation persists until capacitor C3 of timer Z3 is sufficiently charged to indicate the end of the flashing interval. In response, timer Z3 produces a low signal on its terminal 3, turning transistor Q1 off. Also the low signal applied to input 4 of timer Z4 also produces a low signal at its output terminal 3 also turning transistor Q2 off. Therefore, the relay contacts RLA, RLB and RLC return to the original, illustrated position. This terminates the cycle and returns control of the lamps AB, LB and HB to the switches L and H.

Referring to FIG. 2 an alternate relay arrangement is illustrated wherein previously illustrated relay contacts RLA, RLB and RLC are wired differently to control a pair of high beam lamps HBR and HBL, which are a right and left, respectively, high beam on a vehicle. The contacts are shown in their unenergized positions so that single switch H can simultaneously illuminate both lamp HBR and HBL. When the flashing interval starts, the poles of contacts RLA and RLB are thrown to the opposite position giving control of powering the lamps to contacts RLC. Contacts RLC again cycle at a 2 Hertz rate. Therefore, power is alternately applied to high beam HBR and then high beam HBL. This cycling continues until the flashing interval self-cancels when the relay contacts return to the original illustrated positions.

For the embodiments of FIGS. 1 and 2, at the end of the cycling period the various lamps are restored to their original condition, that is, illuminated or not. Also, a definite flashing action occurs since whether the lamp was illuminated or not, it will, nevertheless, flash to indicate a warning.

Referring to FIG. 3, an exemplary mounting scheme is illustrated for a bicycle having a handlebar 30 mounted on a steering column 32. Also mounted on steering column 32 is a headlight 34 having a power-switch H. Mounted to the right on handlebar 30 is a manual switch S1 wired to a circuit box 36 containing the circuitry shown in FIG. 1, except for external lamps and manual switches. In this embodiment, the horn is contained in box 36. The normal internal connection between switch H and the lamp of headlight 34 is interrupted as shown in FIG. 1 and connected to the circuitry in flasher box 36. It will be understood that this particular mounting scheme is one of many possible mounting schemes. Furthermore, the lamps controlled by the flasher may be located to the rear and side of the vehicle. Also, the mouting of the circuitry can be at any convenient location.

It is to be appreciated that various modifications may be implemented with respect to the above described preferred embodiments. For example, while integrated circuits are shown, in some embodiments discrete circuitry may be employed. Also while relays are disclosed, in some embodiments, semiconductor switches may be useful. Also the number and position of the lamps controlled by the flasher may be varied depending upon the application. Furthermore, instead of capacitive timing, in some embodiments a digital timer may be used where appropriate. The following is a list of the specific values of the illustrated components. But it will be understood that for other embodiments these values can be altered depending upon the desired speed of operation, temperature stability, power rating, etc.:

Z1, Z2: 4049 Hex Inverter,
Z3, Z4: 555 Timer,
CR1, CR2, CR3: IN4148,
C1, C2: 0.1 $\mu$f,
C3, C5: 1.0 $\mu$f, 50 V,
C4, C6: 0.01 $\mu$f,
C7, C8: 0.22 $\mu$f,
R1, R6, R7: 4.7K, ¼W,
R2: 3.3M, ¼W,
R3: 10K, ¼W,
R4: 270K, ¼W,
RL1: HL2P, 12 VDC Relay, by Aromat, Japan,
RL2: HL1P, 12 VDC Relay, by Aromat, Japan,
Q1, Q2: 2N3904.

Obviously, many modifications and variations of the present invention are possible in light of the above teachings. It is, therefore, to be understood that within the scope of the appended claims, the invention may be practiced otherwise than as specifically described.

What is claimed is:

1. A flasher for flashing a vehicle light normally powered by a power switch, comprising:
   a manual switch;
   an interval means coupled to said manual switch for providing in response to its operation a duration signal of at least a predetermined duration;
   cycling means coupled to said interval means for providing a periodic cycling signal in response to and for the duration of said duration signal, said predetermined duration of said duration signal exceeding the period of said periodic cycling signal;
   pulsing means for providing a power output, said pulsing means being coupled to said cycling means for blanking said power output in response to and synchronously with said cycling signal; and
   substitution means coupled to said power switch, said interval means and said pulsing means for repowering said light from said pulsing means instead of said power switch in response to and for the duration of said duration signal, said substitution means being operable by said interval means in the absence of said periodic signal from said cycling means to power said vehicle light for said predetermined duration, whereby said vehicle light is flashed for said predetermined duration.

2. A flasher according to claim 1 wherein the vehicle has a horn and wherein said manual switch is coupled to said horn and said interval means for operating both, whereby the sounding of said horn is accompanied by the flashing of said vehicle light.

3. A flasher according to claim 1 wherein said light comprises a pair of lighting elements, said pulsing means having a pair of output terminals each providing said power output, said output terminals being blanked at opposite phases by said cycling means, said substitution means being operable to repower said lighting elements from a corresponding one of said output terminals, so that operation of said manual switch causes said lighting elements to flash alternately.

4. A flasher according to claim 1 wherein said pulsing means and said substitution means are connected to repower said light without regard to the failure of said cycling signal of said cycling means.

5. A flasher according to claim 4 wherein said interval means is operable to terminate said cycling signal at the end of said predetermined duration.

6. A flasher according to claim 3 wherein said pair of lighting elements are operable to provide a beam aimed relatively high with respect to low beam headlights on the vehicle, whereby actuation of said manual switch causes both high beams to alternate between themselves.

7. A flasher according to claim 1 wherein said interval means includes:
a timer coupled to and triggered by said manual switch for producing a signal of a duration independent of the cycling means.

8. A flasher according to claim 7 wherein said timer consists of an analog circuit.

9. A flasher according to claim 7 wherein said pulsing means and said substitution means are connected to repower said light without regard to the failure of said cycling signal of said cycling means.

10. A flasher according to claim 9 wherein said interval means is operable to terminate said cycling signal at the end of said predetermined duration.

11. A flasher according to claim 3 wherein said pair of light elements includes a high beam headlight and a low beam headlight, so that operation of said manual switch causes said high beam headlights to alternate with said low beam headlights.

12. A flasher according to claim 10 wherein said substitution means includes:
a substitution relay connected to said power switch, said light and said interval means to keep control of said light in said power switch when said substitution relay is unenergized.

13. A flasher according to claim 12 wherein said pulsing means includes:
a pulsing relay connected to said substitution relay and said cycling means to apply power to said light when said substitution relay is energized and said pulsing relay is not.

14. A flasher according to claim 13 further comprising:
a buffer connected between said manual switch and said interval means.

15. A flasher according to claim 2 further comprising:
a silent switch serially connected between said interval means and said manual switch, actuation of said silent switch causing operation of said interval means but not said horn.

* * * * *